May 16, 1967  W. W. WARD  3,319,830
LIQUID DISPENSER
Filed April 12, 1965  2 Sheets-Sheet 2
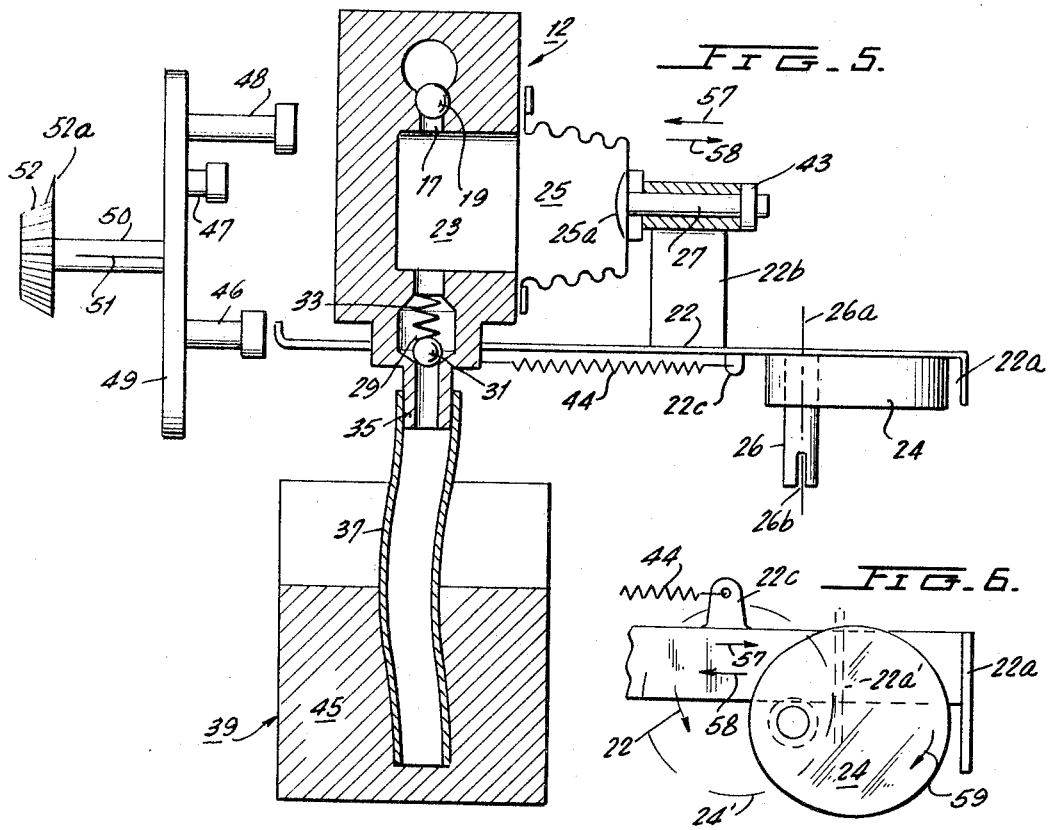
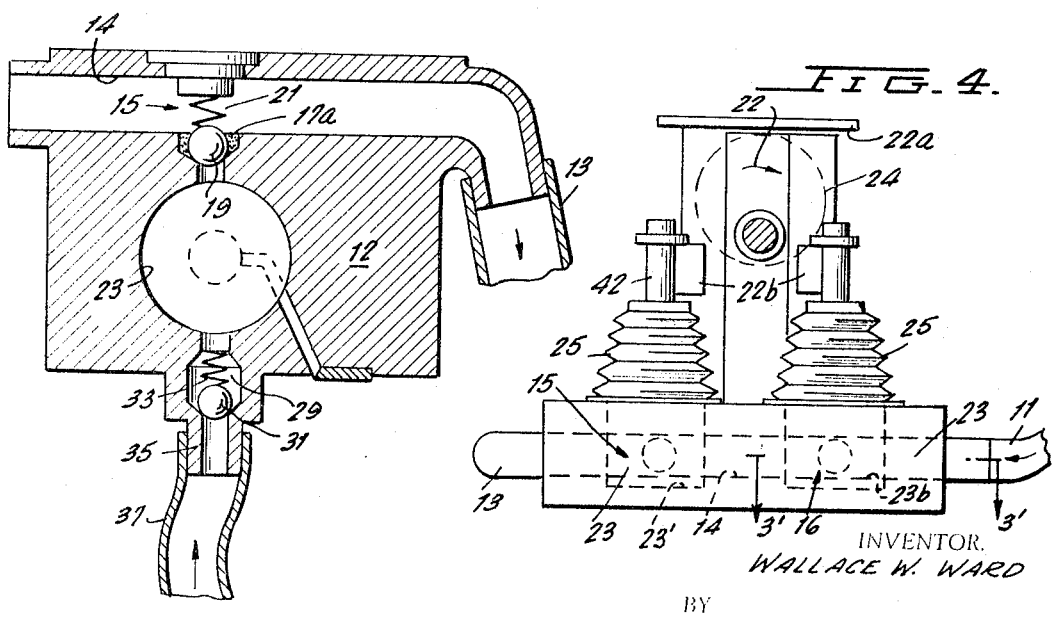
INVENTOR.
WALLACE W. WARD
BY
OSTROLENK, FABER, GERB & SOFFEN
ATTORNEYS

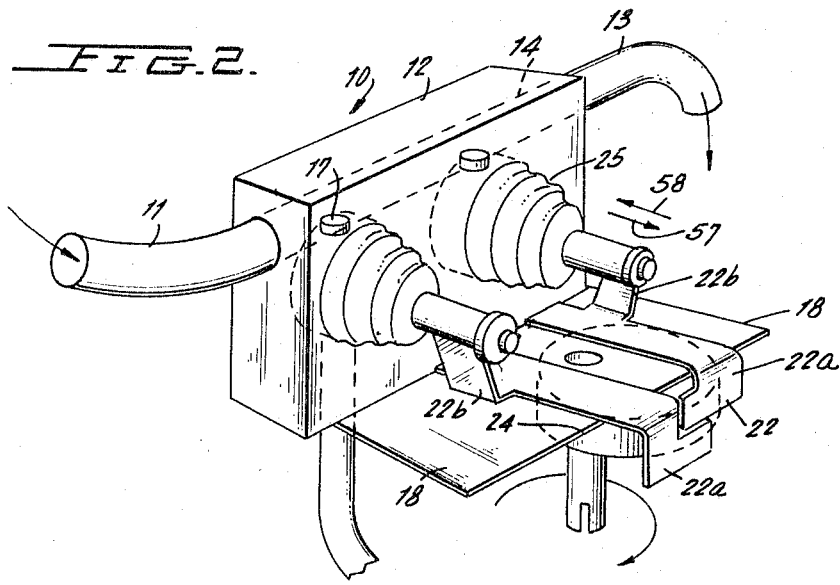
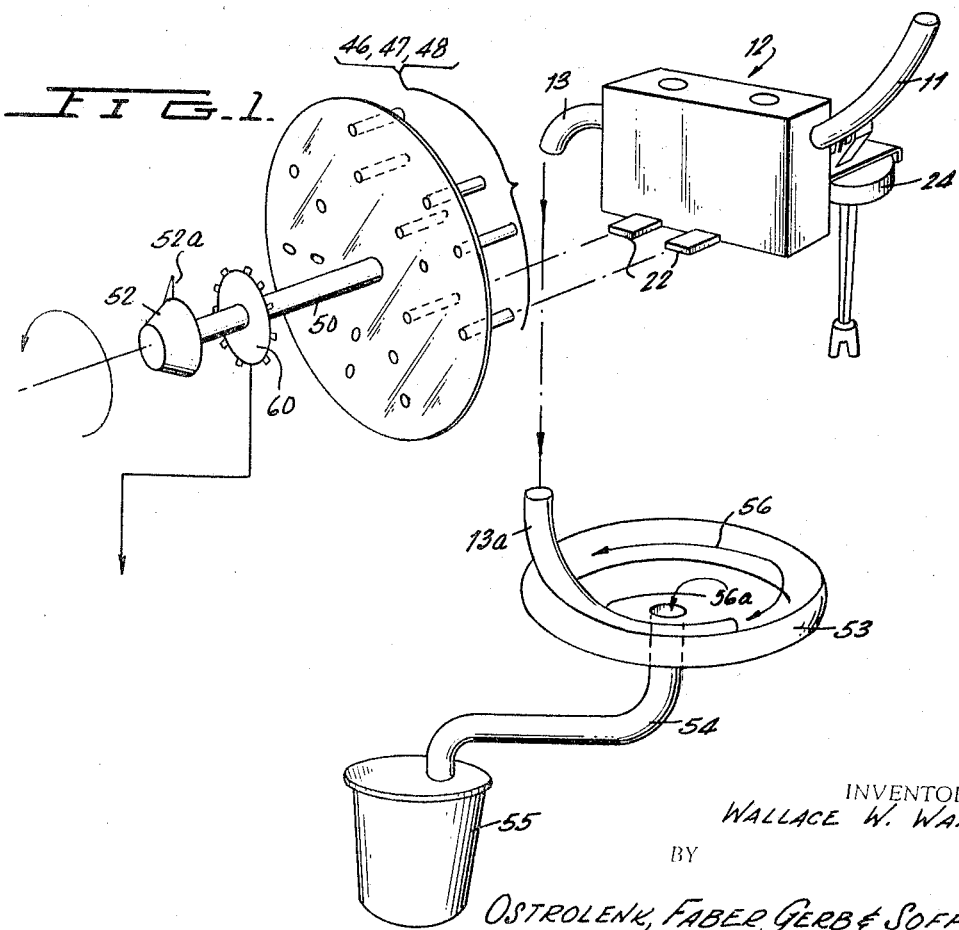

United States Patent Office 3,319,830
Patented May 16, 1967

3,319,830
LIQUID DISPENSER
Wallace W. Ward, 28 Long Hill Lane, Chatham
Township, Chatham, N.J. 07928
Filed Apr. 12, 1965, Ser. No. 447,172
13 Claims. (Cl. 222—20)

The instant invention relates to dispensing means and more particularly to automatic means for dispensing liquids of the type typically employed in vending machine beverages wherein the mechanism automatically and accurately dispenses predetermined amounts of liquids and wherein the amount of liquid dispensed may be manually selected.

Automatic vending machines which presently find widespread use throughout the United States are typically designed to provide a variety of drink combinations. For example, some machines provide soup, carbonated beverages and coffee within the same machine. In machines vending a coffee beverage it is quite typical to find the machine equipped with the capability of providing a variety of coffee selections such as, for example, black coffee; coffee with cream; black coffee with one sugar; black coffee with two sugars; coffee with cream and one sugar and coffee with cream and two sugars. In machines of this type it is important to provide drinks that are uniform in the ingredients that they contain in order to further insure and control the quality of each drink.

Vending machines are typically classified in two general categories, namely those which are provided in high demand areas and those which are provided in marginal or low demand areas. Machines employed in high yield areas are normally expected to supply as many as 500–700 cups of coffee per day, whereas machines in marginal or low yield areas may provide 500 cups of coffee over a period of two weeks or more. In such high yield areas it becomes economically feasible to provide for the services of a maintenance man on a daily basis due to the relatively high rate per machine per day. In the case of the marginal area, such daily or even bi-weekly maintenance causes machines employed in marginal areas to be unprofitable. It is therefore extremely important to provide a machine having a basic design enabling its widespread use in marginal areas and being both economically feasible to construct and maintain in such marginal areas.

When machines are employed in such marginal areas it is normally expected that such machines will experience very little or possibly even non-use over relatively long periods of time. Under such conditions it is important that the machine operate properly and accurately each time it is called upon to do so in spite of the fact that it might have delivered its previous cup of coffee as long as one day or one week before. In order to insure such operation it is quite frequent that such machines employ ingredients that are in such a form as to prevent their spoilage over long periods of time. In addition thereto, in marginal areas, due to the low rate of yield or rate of such machines, it is preferable to make such a machine a self-contained unit having no refrigeration capabilities due to the added expense thereof. Thus, for example, it is typical to provide a cream (or whitener, as it is typically called in the trade) in powdered form and to provide sugar in liquid form.

In machines which employ both powdered and liquid ingredients it is typical to encounter difficulties regarding the caking up or solidifying of powders and the crystalization or evaporation of liquids at and around delivery points. In the case of liquid ingredients such crystallization or evaporation acts to clog up or narrow delivery tubes and orifices thereby having a significant effect upon the measured amounts to be delivered to the beverage cup, thereby affecting the quality of the drink.

The purpose of the instant invention is to provide means of introducing a measured, constant and controllably variable amount of liquid ingredient, such as a syrup and the like, having varying viscosity and qualities, into a quantity of hot water or other high volume and low viscosity medium. Such measured amounts must be as nearly independent of change in viscosity, decrease of pressure or head, in the supply tank, and of effects of crystallization, or orifice, or delivery tube build-up due to evaporation or other causes, which buildup may occur over extended periods of inattention or idleness of the machine.

The instant invention is comprised of novel chamber means having automatically controlled bellows means for drawing a predetermined amount of liquid ingredient from a supply tank into the chamber. The chamber is provided with input and output valve means with said input valve means operating to open, enabling the chamber to be filled, in readiness for a delivery operation and under control of the vacuum established by the bellows means. During the second portion of the process the bellows means contracts, acting to open the output valve means in order to deliver the measured amount of liquid ingredient into the vending machine main supply tube which may supply either a hot or cold liquid. The output valve means automatically opens to permit this function to be performed while the input valve means prevents the liquid ingredient from returning to the supply tank. The input valve means is so arranged as to effectively seal and and retain closed the liquid ingredient supply portion of the system during all but an extremely brief period of time so as to retain the freshness and homogeneity of the liquid ingredient. Even during periods when the input valve means is open the output valve means remains closed and effectively keeps the input supply portion closed at all times.

The output valve means is so designed as to make physical contact with the main liquid ingredient employed in the beverage such as, for example, hot or cold water, carbonated water, and the like. The passage of the main liquid ingredient through the valve means acts to keep the valve means components clean. The valve means is further designed so as to capture some of the primary liquid which surrounds the primary valve member so as to serve the dual functions of acting as a residual water seal and keeping the valve means components free from crystallization.

The liquid dispenser bellows means is operated through the cooperative functions of bias means normally biasing the bellows means to a closed position and rotatable cam means designed to cooperate with slide means for moving the bellows means against the bias means for opening same.

The amount of liquid delivered to the beverage mixing station is controlled by rotatable selector disc means having a plurality of variable length attenuating pins. The attenuating pins are designed to confront one end of said slide means in order to control the amount of contraction experienced by said bellows means. Said selector disc means is provided with manually operable dial means for rotating said selector disc means to position attenuating pins of varying lengths adjacent said one end of said supply means. The liquid dispenser means is preferably provided with first and second bellows means and bellows chambers capable of simultaneously delivering first and second liquids to the beverage mixing station. By combining said bellows chambers into a single manifold body, single cam means are suitable for operating both of said bellows means simultaneously while said selector disc means permits the bellows means to be controlled to deliver differing quantities of the liquids to be delivered. Once manual selection of the quantities of liquid ingredients to be delivered is made, the entire operation is fully automatic and is preferably initiated under control of the deposit of the appropriate coin into the vending machine coin slot. Drive means for the instant invention may be any suitable means such as typical motor means designed to provide rotary movement and is satisfactory for activating all of the functions of the liquid dispenser means.

Due to the effective sealing of the entire system for all but extremely brief time intervals, the liquids to be delivered are kept fresh and homogeneous. The "washing actions" serve to keep all parts free from crystallization or gumming on the liquid dispenser means components. By the provision of the novel bellows means for the purpose of delivering the liquid ingredient to the bellows chambers and subsequently to the beverage mixing station the apparatus is capable of delivering predetermined measured amounts completely independent of viscosity, decrease of pressure, or head in the supply tank or of effects of crystallization or orifice buildup due to evaporation and the like even though the apparatus be idle for extended periods of time.

It is therefore one object of the instant invention to provide novel liquid dispenser means for delivering predetermined amounts of liquid ingredient being designed to provide such accurate amounts regardless of changes in viscosity, decrease of pressure or head in the supply tank, or effects of crystallization or orifice buildup which may be due to evaporation or other causes.

Another object of the instant invention is to provide novel liquid dispenser means for use in vending machines and the like comprising cam operated bellows means for controlling delivery of predetermined amounts of a liquid ingredient to a bellows chamber and subsequently to a mixing station.

Stitll another object of the instant invention is to provide novel liquid dispenser means for use in vending machines and the like comprising novel cam operated bellows means for delivering predetermined amounts of a liquid ingredient to a bellows chamber and subsequently to a beverage mixing station and further comprising novel input and output valve means cooperating with said bellows means to accurately control the amount of the liquid ingredient to be delivered.

Another object of the instant invention is to provide novel liquid dispenser means for use in vending machines and the like having cam operated bellows means wherein the amount of travel of said bellows means is controlled by selector disc means manually positionable to select a combination of different amounts of liquid ingredient to be delivered to the beverage mixing station.

Still another object of the instant invention is to provide novel liquid dispenser means for use in vending machines and the like and comprised of first and second cam operated bellows means for delivering first and second liquid ingredients to associated bellows chambers and subsequently to a beverage mixing station, said cam means being operative to simultaneously control said first and second bellows means.

Still another object of the instant invention is to provide novel liquid dispenser means for use in vending machines and the like and comprised of first and second cam operated bellows means for delivering first and second liquid ingredients to associated bellows chambers and subsequently to a beverage mixing station, said cam means being operative to simultaneously control said first and second bellows means and further comprising rotatable selector disc means for independently and simultaneously controlling said first and second bellows means for delivering differing quantities of liquid ingredients.

These and other objects of the instant invention will become apparent when reading the accompanying description and drawings in which:

FIGURE 1 is a perspective view showing the salient features of a liquid dispenser means designed in accordance with the principles of the instant invention.

FIGURE 2 is a perspective view showing the liquid dispenser means, bellows means and manifold member of FIGURE 1 in greater detail.

FIGURE 3 is a sectional view of the liquid dispenser means taken along the lines 3–3' of FIGURE 4.

FIGURE 4 is a top view of the liquid dispenser means of FIGURE 2.

FIGURE 5 is a side elevational view of the liquid dispenser means of FIGURE 1 with the manifold body of the liquid dispenser means being shown in section.

FIGURE 6 is a top view of the cam arrangement of FIGURES 1, 2 and 5, showing the interaction between the cam member and the slide members, in greater detail.

Referring now to the drawings and more particularly to FIGURES 1–5, a liquid dispenser system 10 is shown therein being comprised of an input tube 11 for receiving the main liquid ingredient for the beverage to be mixed. For example, in a coffee vending machine hot water from a supply source (not shown) will automatically be driven, by means not shown, to the open end of input tube 11 during the liquid dispensing phase of the machine.

The input tube 11 has a lower end thereof connected in any suitable manner to the liquid dispenser means manifold body. The manifold body 12 is provided with an elongated cylindrical opening 14 aligned substantially horizontally and having secured thereto at the opposite end thereof an output delivery tube 13. The output delivery tube connects the manifold body and hence the input tube 11 to a mixing bowl 53 (see FIGURE 1) in such a manner that the liquid, when introduced to the mixing bowl 53, also referred to as the beverage mixing station, will be swirled around in the direction of arrows 56 so that all of the liquid ingredients (and powdered ingredients, if there are any) will be admixed before entering the exit opening 56a and ultimately the exit 54 so as to be introduced into the beverage cup 55.

The elongated opening 14 of manifold body 12, which extends the length of body 12 has, disposed at intervals along said body, a multiplicity of valve chambers 15 and 16. As can clearly be seen from FIGURES 1–5 each of the valve chambers 15 and 16 are substantially identical to one another and have therefore been labeled with identical designated numerals. For this reason only, a single valve chamber arrangement will be described, it being assumed that the description refers to either the left or right-hand chamber arrangement, or both, due to the substantial similarity therebetween.

Each valve arrangement 15 and 16 is comprised of an upper valve chamber 17 having a valve ball 19 seated therein. The valve ball 19 is biased into the position shown in FIGURE 3, for example, by means of a ball spring 21 having the lower end thereof secured to valve ball 19 and the upper end thereof secured to the top side of the opening 14. The valve chamber 17 communicates between the cylindrical opening 14 and a bellows chamber 23, which in the preferred embodiment is a substantially cylindrically-shaped opening having first and second substantially flat parallel sides 23a and 23b, as can best be seen in FIGURE 4. The valve chambers 23 are open at their forward ends and communicate with a substantially cone-shaped bellows member 25 having a first end thereof arranged to seal the opening of the bellows chamber 23 and having a second end thereof secured to a push-rod member 27. The bellows 25 is arranged to expand and contract in the direction of arrows 57 and 58, respectively, shown in FIGURE 2, under control of a cam member 24, in a manner to be more fully described.

Each valve chamber 23 has at its lower end a lower valve chamber 29 comprising a valve ball 31 biased in the position shown in FIGURE 3 by means of a spring member 33. The upper end of spring member 33 is secured to the manifold body 12 while the lower end thereof makes rigid contact with the valve ball 31. The lower valve chamber has, as an integral part thereof, a tubular projection 35 arranged to be coupled with a supply hose 37, in the manner shown in FIGURES 2, 3 and 5, which supply hose extends into a cannister 39 filled with a liquid ingredient 45 such as, for example, liquid sugar, liquid syrup, liquid coffee, cream or milk, or any other liquid ingredient. During the expansion operation of the bellows member, which takes place in a manner to be more fully described, the liquid ingredient 45 is fed upward through supply tube 37 and through lower valve chamber 29 into the bellows chamber 23. This action takes place due to the vacuum created by the expansion of bellows member 25. During the contraction of bellows member 25 a liquid captured within chamber 23 is forced upward through the upper valve chamber 17 and into the elongated opening 14, where it is admixed with the main liquid such as, for example, water entering through the input tube 11. Both of these liquids are subsequently passed through the output tube 13 into the beverage mixing station 53.

Since the lower ball valve 31 is always immersed in the liquid medium and since this liquid medium 45 is contained within a closed system and hence is sealed from the atmosphere, the lower ball valve 31 will remain functional without any attention whatsoever. Since the volume of liquid delivered is a product of the mechanical displacement of the bellows 25, the volume will tend to remain constant while the pressure required to displace it will vary with the condition of the exit valve chamber 17. However, the valve chamber 17 is so designed as to provide a small reservoir 17a about valve ball 19. Since the hot water (in the case of coffee, tea or hot chocolate) is caused to flow through the elongated opening 14 and will therefore flow over and around the upper valve ball 19 and spring 21, this movement of the liquid will carry away any syrup delivered into the tube so as to "wash" or "cleanse" the elements 19 and 21, keeping them free from any collection of liquid thereon. The reservoir, or well, 17a permits a residual resident quantity of hot water to be captured therein so as to cover the ball valve 19 to still further retain the valve arrangement 15 in a clean condition and prevent any change in the orifice diameter even over extended periods of machine idleness.

While the arrangement of FIGURE 5 shows the supply cannister 45 positioned below the manifold body 12, the system of the instant invention may be used equally well with cannisters disposed above the bellows 25 thus introducing a variable input pressure due to static or head pressure in the cannister. However, assuming suitable spring tension by bias member 33 upon lower valve ball 31 the volume delivery will still be related to displacement of bellows 25 rather than the head in the cannister 39.

Selection, omission, or regulation of one or more, or all of the liquids to be dispensed by the liquid dispenser means 10, is accomplished by interrupting or blocking or partially blocking the displacement of the bellows in the following manner:

In the preferred embodiment of FIGURES 2 and 5, and specifically FIGURE 5, the valve dispenser means 10 is provided with a frame or bracket member 18 for securing manifold body 12 to any suitable support means such as, for example, support means which may be provided within an automatic vending machine. In addition to supporting the manifold body 12, bracket 18 acts to support and guide first and second slide members 22, arranged to cooperate with the first and second bellows 25. Each slide member 22 is provided with a tab 22a at the forward end thereof, with said tabs being disposed and positioned so as to cooperate with a rotatable eccentric cam means 24. Cam member 24 is rigidly secured to a shaft member 26 designed to rotate cam 24 about the longitudinal axis 26a. The rotary drive means for shaft 26 and cam 24 may be any suitable rotary drive means or motor designed to rotate cam 24 either clockwise or counterclockwise, but preferably clockwise, in the direction shown by arrow 59 of FIGURE 6. Shaft 26 may be secured to the primary drive means (not shown) in any suitable manner such as, directly by a coupling member, by chain drive, or any other suitable means. Said drive means should be designed, however, so as to have suitable detent means to cause said cam means 24 to make one full revolution per dispensing operation. However, if more flexibility of the dispensing means is desired, said motor means could be designed to control said cam means to make two or more controlled amounts of revolutions. However, this not necessary since suitable quantity control means, to be more fully described, are set forth in the instant application.

Each slide member 22 has provided thereon a diagonally extending arm 22b positioned along one side thereof and having a tubular-shaped end 42 arranged to position and secure a pushrod or actuator rod member 27 by fastening means 43. One end of said actuator rod 27 is rigidly secured to bellows member 25 at 25c and in such a manner as to provide an hermetic seal therebetween. Each slide member 22 is further provided with an ear 22c having a suitable opening for receiving one end of a spring member 44, the opposite end of which is affixed to manifold body 12. Spring member 44 is so designed as to normally bias its associated slide member 22 in a direction shown by arrow 57 of FIGURES 5 and 6, for example.

The initial, or starting position, of the cam means 24 is shown in the dotted line fashion 24' of FIGURE 6. In this position tab 22a', shown in dotted fashion, bears against the surface of the cam 24' under control of bias member 44 causing the bellows 25 to be in its fully collapsed position.

The normal operation of the liquid dispensing means, when employed in an automatic vending machine, is such that the user, after making the selection of the desired drink, deposits the appropriate coinage in the vending machine coin slot (not shown) to activate the machine into operation. During the liquid dispensing phase the prime mover (not shown) becomes operative to rotate shaft 26 and hence cam 24 so that the cam moves from the dotted line position 24' of FIGURE 6 to the solid line position 24 of FIGURE 6. This causes the tab 22a and hence the slide member 22 to move from the dotted line position 22a' to the solid line position 22a causing the bellows 25 to expand. This expansion creates a vacuum within bellows 25 and cooperating chamber 23, acting to draw the liquid ingredient 45 in cannister 39 upward through supply hose 37 and the valve chamber 29 and into the bellows chamber 23.

The cam member 24 continues to rotate so as to move from the solid line position 24 of FIGURE 6 to the dotted line position 24' of the same figure. This causes the tab 22a of slide member 22 to "follow" the cam surface under control of bias spring 44 thereby causing the slide member to move in the direction shown by arrow 58. This causes a contraction or collapsing of bellows 25 thereby causing the liquid contained within the region defined by chamber 23 and bellows 25 to be merged upwardly through the upper valve apparatus 15 and into the elongated opening 14 in the manifold body 12. The lower valve ball being seated within chamber 29 during the collapsing of bellows 25 prevents the return of the liquid ingredient to the supply cannister 39. The upper valve ball 19, however, permits passage of the liquid ingredient into the elongated opening 14. After the liquid ingredient has effectively been delivered into opening 14 valve ball 19 will again be seated in the position shown in FIGURES 3 and 5. During the time when the bellows 25 is expanding the valve ball 19 being seated in the position shown in FIGURE 5 prevents any liquid from entering the elongated opening 14 until the bellows 25 begins its contraction operation.

It can clearly be seen from a consideration of FIGURE 2, that the tabs 22a of slide members 22 overlap one another and confront the cam surface of cam member 24 so as to enable simultaneous operation of the first and second slide members 22 under control of a single rotating cam member.

In order to control the amount of liquid ingredient delivered into bellows chamber 23 and subsequently to the beverage mixing station 53 there is provided a selector disc arrangement 40. The selector disc means 40 is comprised of a manually operable selector knob 52 which is normally designed to be accessible from the front face of a vending machine (not shown). A rotatable shaft 50, designed to rotate about the longitudinal axis 51, is rigidly secured at one end thereof to manually operable control knob 52 and at the other end thereof to a rotatable selector disc 49 having affixed around the periphery thereof a plurality of blocking or attenuating pins 46–48 with said pins being of varying lengths. When the manual control knob 52 is positioned in one of its discrete positions a pair of attenuator or blocking pins will be arranged so as to confront a tab 22d provided at the forward end of the slide members 22. For example, considering FIGURE 5, with the selector disc 49 in the position shown therein, the blocking pin 46 confronts the tab 22d of slide member 22. In this position the blocking pin 46 limits the amount of movement the slide member 22 may experience when moving in the direction shown by arrow 58. By providing a pin 48 which is longer than the pin 46 in the position occupied by pin 46, shown in FIGURE 5, slide member 22 can still be further limited in its movement in the direction shown by arrow 58. In addition thereto, by rotating manually operable knob 52 so that pin 47 occupies the position shown by pin 46, the slide member 22 may experience a greater displacement to the left than that permitted by the blocking pin 46. Still further, if the manually operable control knob 52 is rotated so that no blocking pin is positioned adjacent the tab 22d, the displacement experienced by the slide member 22 to the left will be maximum. Thus by a simple angular positioning of control knob 52 and hence selector disc 49 the amount of displacement of slide member 22 and hence the amount of contraction of bellows 25 may be very accurately controlled so as to control the amount of liquid supplied to the elongated opening 14 of manifold body 12. Selector disc 49 is s designed as to provide a similar set of blocking pins for both of said slide members 22, it being understood that the pins 46–48 may be so arranged so as to control the bellows 25, 25 to simultaneously deliver dissimilar amounts of liquid ingredient. It should be understood that each of the bellows 25, 25 may supply the same liquid to the delivery station or conversely may supply two dissimilar liquids in equal or dissimilar amounts to the delivery station.

The manually operable control knob 52 may be so arranged as to be coupled with a pointer 52a forming an integral part thereof which cooperates with a legend (not shown) which may appear on the front face of a vending machine so as to signify the appropriate selection by alignment of the pointer 52a with the appropriate legends arranged on the front face of the vending machine which may, for example, be black coffee no sugar; black coffee one sugar; black coffee two sugars; coffee cream and no sugar; coffee cream and one sugar, and so forth.

As an alternative embodiment, a tap switch arrangement 60 may be provided on shaft 50 which is so designed as to energize suitable indicator lights (not shown) which light up in a selective manner to indicate the choice made by rotation of the control knob 52.

It can therefore be seen that the instant invention provides a novel liquid dispensing means for dispensing accurately controlled amount of liquid ingredients into a beverage mixing station, for example, and which is so designed as to prevent the buildup of evaporated liquids within the dispensing means. In addition thereto novel manually operable selector means are provided for regulating the predetermined amounts of liquids to be dispensed to the beverage mixing station. The liquid dispensing means provides an effective closed system keeping the liquid to be dispensed sealed at all times except for an extremely brief time interval so as to retain its freshness and homogeneity. The bellows arrangement provided for the dispensing of the liquid ingredient is controlled by cam operated slide means and is so designed as to permit the control of more than one such slide means by a single rotatable cam. Once selection of the predetermined amounts desired to be dispensed is performed, the remaining portion of the operation is fully automatic and is designed to set itself to the starting or home position in readiness for subsequent dispensing operations.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. Liquid dispensing means for use in automatic vending machines and the like comprising first housing means having an elongated opening for passage of a first liquid therethrough to the outlet end; said first means having a second passageway aligned transverse to and communicating with said first opening; said passageway comprising a first chamber positioned beneath said elongated opening; first valve means connecting said first chamber to said elongated opening; and second valve means connecting said first chamber to a second liquid source containing a liquid different from that contained in the first liquid source; reciprocally movable bellows means sealing said first chamber; second means for operating said bellows means through at least one operating cycle; said cycle being comprised of expansion of said bellows means followed by contraction of said bellows means; said first valve means being normally closed during contraction of said bellows means and including means for opening said first valve means upon expansion of said bellows means; said second valve means being normally closed during expansion of said bellows means and including means for opening said second means during contraction of said bellows means to introduce the liquid from said second liquid source into said elongated opening; said first valve means being positioned partially within said elongated opening so as to be cleansed by the fluid from said first liquid source during each dispensing operation.

2. The dispensing means of claim 1 wherein said second means is comprised of rotatable eccentric cam means; slide means coupled to said bellows means and being biased to follow the surface of said cam means for expanding and contracting said bellows means.

3. The dispensing means of claim 1 wherein said second valve means is further comprised of means for capturing some of said first liquid for surrounding said first valve means to keep said first valve means free from contamination throughout its operation.

4. Liquid dispensing means for use in automatic vending machines and the like comprising first housing means having an elongated opening for passage of a first liquid therethrough; said first means having a second passageway aligned transverse to and communicating with said first opening; said passageway comprising a first chamber; first valve means connecting said first chamber to said elongated opening; and second valve means connecting said first chamber to a second liquid source; reciprocally movable bellows means sealing said first chamber; second means for operating said bellows means through at least one operating cycle; said cycle being comprised of expansion of said bellows means followed by contraction of said bellows means; said first valve means being normally closed during contraction of said bellows means and including means for opening said first valve means upon expansion of said bellows means; said second valve means being normally closed during expansion of said bellows means and including means for opening said second means during contraction of said bellows means; said second means comprising rotatable eccentric cam means; slide means biased to follow the surface of said cam means for expanding and contracting said bellows means; rotatable selector disc means having a plurality of attentuator means positioned around said disc means; said attentuator means being selectively positioned to limit the amount of displacement of said slide means.

5. The dispensing means of claim 1 wherein said first valve means is comprised of a valve chamber connecting said first chamber to said elongated opening; ball valve means; bias means within said valve chamber normally biasing said ball valve means to seal said first chamber from said elongated opening.

6. The dispensing means of claim 5 wherein said second valve means is comprised of a valve chamber connecting said first chamber to said second liquid source; ball valve means; bias means within said valve chamber normally biasing said ball valve means to seal said first chamber from said second liquid source.

7. Liquid dispensing means for use in automatic vending machines and the like comprising first housing means having an elongated opening for passage of a first liquid therethrough; said first means having a second passageway aligned transverse to and communicating with said first opening; said passageway comprising a first chamber; first valve means connecting said first chamber to said elongated opening; and second valve means connecting said first chamber to a second liquid source; reciprocally movable bellows means sealing said first chamber; second means for operating said bellows means through at least one operating cycle; said cycle being comprised of expansion of said bellows means followed by contraction of said bellows means; said first valve means being normally closed during contraction of said bellows means and including means for opening said first valve means upon expansion of said bellows means; said second valve means being normally closed during expansion of said bellows means and including means for opening said second means during contraction of said bellows means; said second means comprising rotatable eccentric cam means; slide means biased to follow the surface of said cam means for expanding and contracting said bellows means; said slide means comprising an elongated body portion slidably engageable with said first housing means; said slide means having a first ear projecting toward and secured to said bellows means; said first ear being intermediate the ends of said slide means; a first end of said slide means having a first flange projecting transverse to said body portion to make sliding engagement with said cam means.

8. Liquid dispensing means for use in automatic vending machines and the like comprising first housing means having an elongated opening for passage of a first liquid therethrough; said first means having a second passageway aligned transverse to and communicating with said first opening; said passageway comprising a first chamber; first valve means connecting said first chamber to said elongated opening; and second valve means connecting said first chamber to a second liquid source; reciprocally movable bellows means sealing said first chamber; second means for operating said bellows means through at least one operating cycle; said cycle being comprised of expansion of said bellows means followed by contraction of said bellows means; said first valve means being normally closed during contraction of said bellows means and including means for opening said first valve means upon expansion of said bellows means; said second valve means being normally closed during expansion of said bellows means and including means for opening said second means during contraction of said bellows means; said second means comprising rotatable eccentric cam means; slide means biased to follow the surface of said cam means for expanding and contracting said bellows means; rotatable selector disc means having a plurality of attenuator means positioned around said disc means; said attenuator means being selectively positioned to limit the amount of displacement of said slide means; said slide means comprising an elongated body portion slidably engageable with said first housing means; said slide means having a first ear projecting toward and secured to said bellows means; said first ear being intermediate the ends of said slide means; a first end of said slide means having a first flange projecting transverse to said body portion to make sliding engagement with said eccentric cam means.

9. Liquid dispensing means for use in automatic vending machines and the like comprising first housing means having an elongated opening for passage of a first liquid therethrough; said first means having a second passageway aligned transverse to and communicating with said first opening; said passageway comprising a first chamber; first valve means connecting said first chamber to said elongated opening; and second valve means connecting said first chamber to a second liquid source; reciprocally movable bellows means sealing said first chamber; second means for operating said bellows means through at least one operating cycle; said cycle being comprised of expansion of said bellows means followed by contraction of said bellows means; said first valve means being normally closed during contraction of said bellows means and including means for opening said first valve means upon expansion of said bellows means; said second valve means being normally closed during expansion of said bellows means and including means for opening said second means during contraction of said bellows means; said second means comprising rotatable eccentric cam means; slide means biased to follow the surface of said cam means for expanding and contracting said bellows means; rotatable selector disc means having a plurality of attenuator means positioned around said disc means; said attenuator means being selectively positioned to limit the amount of displacement of said slide means; said slide means comprising an elongated body portion slidably engageable with said first housing means; said slide means having a first ear projecting toward and secured to said bellows means; said first ear being intermediate the ends of said slide means; a first end of said slide means having a first flange projecting transverse to said body portion to make sliding engagement with said eccentric cam means; a second end of said slide means having a second flange positioned to engage said rotatable selector disc means to limit the displacement of said slide means.

10. Liquid dispensing means for use in automatic vending machines and the like comprising first housing means having an elongated opening for passage of a first liquid therethrough; said first means having a second and third passageway aligned transverse to and communicating with said first opening; each of said passageways comprising a first chamber positioned beneath said elongated opening; first valve means connecting said first chamber to said elongated opening; and second valve means connecting said first chamber to second plural liquid sources; reciprocally movable bellows means sealing said first chamber; second means for operating said bellows means through at least one operating cycle; said cycle being comprised of expansion of said bellows means followed by contraction of said bellows means; said first valve means being normally closed during contraction of said bellows means and including means for opening said first valve means upon expansion of said bellows means; said first valve means being positioned partially within said elongated opening so as to be cleansed by the fluid from said first liquid source during each dispensing operation; said second valve means being normally closed during expansion of said bellows means and including means for open- 11. Liquid dispensing means for use in automatic vending machines and the like comprising first housing means having an elongated opening for passage of a first liquid therethrough; said first means having a second and third passageway aligned transverse to and communicating with said first opening; each of said passageways comprising a first chamber; first valve means connecting said first chamber to said elongated opening; and second valve means connecting said first chamber to a second liquid source; reciprocally movable bellows means sealing said first chamber; second means for operating said bellows means through at least one operating cycle; said cycle being comprised of expansion of said bellows means followed by contraction of said bellows means; said first valve means being normally closed during contraction of said bellows means and including means for opening said first valve means upon expansion of said bellows means; said second valve means being normally closed during expansion of said bellows means and including means for opening said second means during contraction of said bellows means; said second means comprising single rotatable eccentric cam means; and slide means biased to follow the surface of said single cam means for expanding and contracting each of said bellows means.

12. Liquid dispensing means for use in automatic vending machines and the like comprising first housing means having an elongated opening for passage of a first liquid therethrough; said first means having a second and third passageway aligned transverse to and communicating with said first opening; each of said passageways comprising a first chamber; first valve means connecting said first chamber to said elongated opening; and second valve means connecting said first chamber to a second liquid source; reciprocally movable bellows means sealing said first chamber; second means for operating said bellows means through at least one operating cycle; said cycle being comprised of expansion of said bellows means followed by contraction of said bellows means; said first valve means being normally closed during contraction of said bellows means and including means for opening said first valve means upon expansion of said bellows means; said second valve means being normally closed during expansion of said bellows means and including means for opening said second means during contraction of said bellows means; said second means comprising single rotatable eccentric cam means; slide means having a flange and being biased to follow the surface of said cam means for expanding and contracting each of said bellows means; said cam means making sliding engagement with the first flanges of both of said slide means.

13. Liquid dispensing means for use in automatic vending machines and the like comprising first housing means having an elongated opening for passage of a first liquid therethrough; said first means having a second passageway aligned transverse to and communicating with said first opening; said passageway comprising a first chamber; first valve means connecting said first chamber to said elongated opening; and second valve means connecting said first chamber to a second liquid source; reciprocally movable bellows means sealing said first chamber; second means for operating said bellows means through at least one operating cycle; said cycle being comprised of expansion of said bellows means followed by contraction of said bellows means; said first valve means being normally closed during contraction of said bellows means and including means for opening said first valve means upon expansion of said bellows means; said second valve means being normally closed during expansion of said bellows means and including means for opening said second means during contraction of said bellows means; said second means comprising rotatable eccentric cam means; slide means biased to follow the surface of said cam means for expanding and contracting said bellows means; rotatable selector disc means having a plurality of attenuator means positioned around said disc means; said attenuator means being selectively positioned to limit the amount of displacement of said slide means; said slide means comprising an elongated body portion slidably engageable with said first housing means; said slide means having a first ear projecting toward and secured to said bellows means; said first ear being intermediate the ends of said slide means; a first end of said slide means having a first flange projecting transverse to said body portion to make sliding engagement with said eccentric cam means; a second end of said slide means having a second flange positioned to engage said rotatable selector disc means to limit the displacement of said slide means; bias means connected between said slide means and said first housing for urging said slide means into engagement with the cam surface of said cam means.

References Cited by the Examiner

UNITED STATES PATENTS

| | | | |
|---|---|---|---|
| 3,092,029 | 6/1963 | Hanson et al. | 103—150 X |
| 3,134,508 | 5/1964 | Bayer et al. | 222—129.4 X |

ROBERT B. REEVES, *Primary Examiner.*

STANLEY H. TOLLBERG, *Examiner.*